Jan. 31, 1939.  B. R. GRANBERG ET AL  2,145,255
BRAKE MECHANISM
Filed Jan. 13, 1938  2 Sheets-Sheet 1
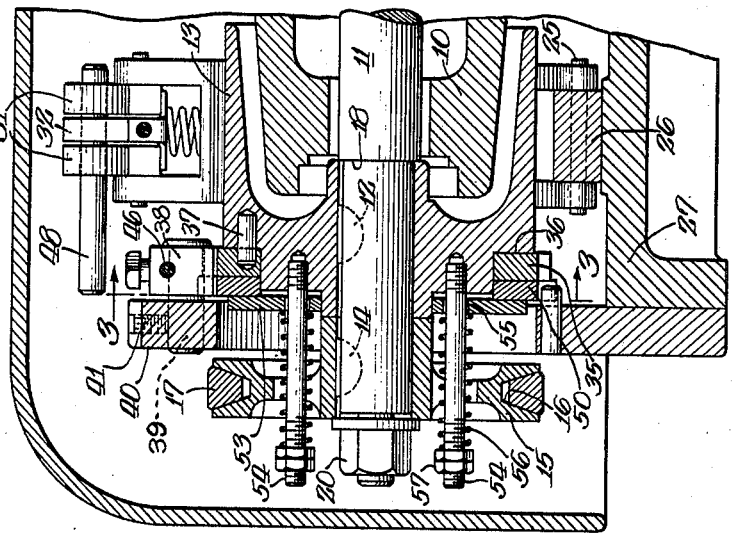
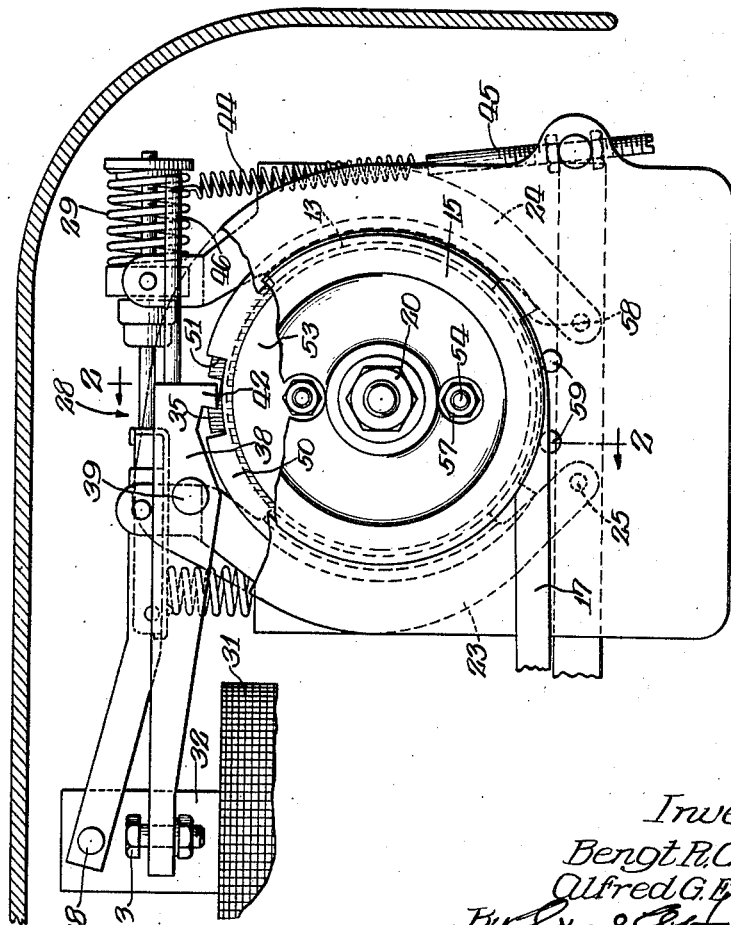
Inventors:
Bengt R. Granberg,
Alfred G. Ericson,

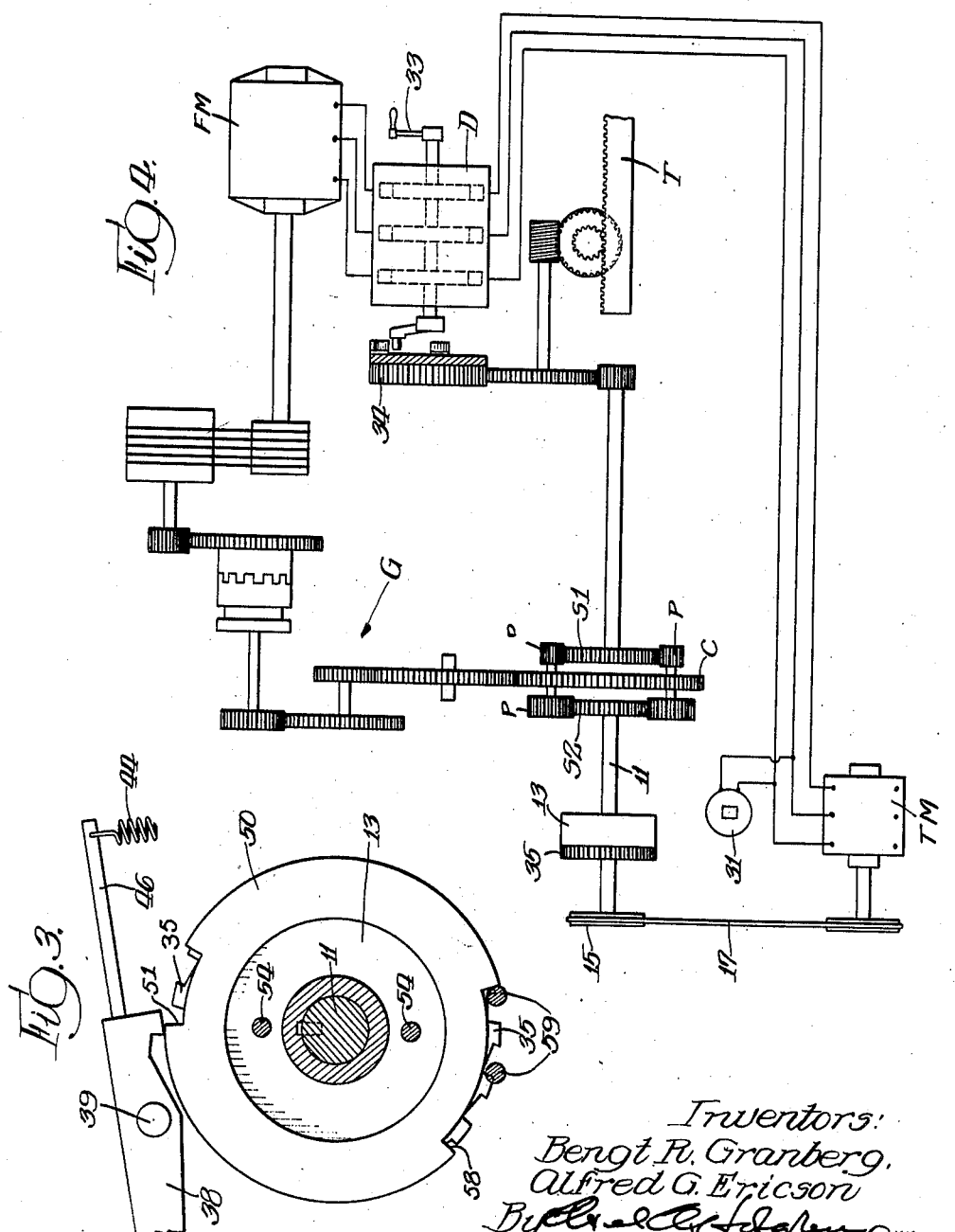

Patented Jan. 31, 1939

2,145,255

UNITED STATES PATENT OFFICE 2,145,255

BRAKE MECHANISM

Bengt R. Granberg and Alfred G. Ericson, Rockford, Ill., assignors to Sundstrand Machine Tool Co., Rockford, Ill., a corporation of Illinois Application January 13, 1938, Serial No. 184,731

17 Claims. (Cl. 82—21)

The invention relates generally to brake mechanisms and more particularly to brake mechanisms having both frictional and mechanically engaging means for arresting and preventing rotation.

A general object of the invention is to provide a new, improved and simplified construction in a brake mechanism of the character described.

A more particular object is to provide in a brake having mechanically engaging means, as well as frictional means, new and improved means for holding the mechanically engaging means out of engagement until the element to be braked has been brought to rest.

Another object is to provide a brake having frictional means for bringing a rotatable element to rest, mechanically engaging means for holding the rotatable element stationary, and means for permitting or preventing engagement of said mechanical means responsive to counter or reverse rotation of said rotatable element after it has been stopped to permit engagement of said mechanical means.

Yet another object is to provide a brake particularly adapted for use with a planetary gear system employed in driving a member in opposite directions at feed and traverse speeds, such as a table of a machine tool, said brake having frictional means for bringing to rest one element of the planetary gear system which is normally driven when the member is to be driven at a traverse rate, mechanically engaging means for holding said one element of the planetary gear system stationary after it has been brought to rest, and an element having a limited oscillatory movement and operating in its various positions to permit or prevent engagement of said mechanical means, said element being frictionally driven by said one element of the planetary gear system to a position preventing engagement of the mechanical means when said element is rotated to drive the member at a traverse rate, and carried to a position permitting engagement of said mechanical means when said one element of the planetary gear system is rotated reversely as an incident to the reaction of the planetary gear system when the member is driven at a feed rate of movement.

Other objects and advantages will become apparent from the following detailed description taken in connection with the accompanying drawings, in which:

Fig. 1 is a view partially in section and partially in elevation of a brake embodying the features of the invention.

Fig. 2 is a sectional view taken approximately along the line 2—2 of Fig. 1 and looking in the direction of the arrows thereon.

Fig. 3 is a fragmentary view taken approximately along the line 3—3 of Fig. 2 looking in the direction of the arrows thereon.

Fig. 4 is a diagrammatic view showing the brake employed with a planetary gear system driving a carriage of a machine tool.

While the invention is susceptible of various modifications and alternative constructions, it is shown in the drawings and will be described hereinafter in a preferred embodiment, but it is not intended that the invention is to be limited thereby to the specific construction disclosed, but it is intended to cover all modifications and alternative constructions falling within the spirit and scope of the invention as defined by the appended claims.

Though the invention is adapted for a variety of uses, it is particularly adapted for use with an element having a tendency toward counter or reverse rotation after the element has been brought to rest. Exemplary of such an element is a gear of a differential or planetary gear system employed in driving a member in forward and reverse directions and at traverse and feed rates of movement, for example, a table of a machine tool. Reference is, therefore, made to the copending application of Bengt Granberg and John B. Sinderson, Serial No. 66,463, filed February 29, 1936, which discloses a planetary gear system arranged to drive the table of a lathe in a forward and reverse direction and at rapid traverse and feed rates of movement. That application, moreover, discloses a brake of the general type to which this invention relates and upon which this invention is an improvement.

A planetary gear system of the type disclosed in the application of Bengt Granberg et al., above referred to, and herein disclosed diagrammatically in Fig. 4, comprises generally a first sun gear S1 which is associated with a table T to be driven, a second sun gear S2, and a planet gear carrier C having pairs of planet gears P journaled in the carrier C and cooperating with the sun gears. The planet gear carrier C may be driven in both a forward and reverse direction by means such as a reversible electric motor FM through suitable gearing generally designated G, while the second sun gear S2 also is driven in both a forward and reverse direction by suitable means such as a reversible electric motor TM. With the gearing shown, a feed rate of movement of the table T is obtained by holding the second sun gear S2 stationary while the planet gear carrier C is rotated, and a traverse rate of movement is obtained by rotating the sun gear S2 with or without rotation of the planet gear carrier. Hence the motor driving the planet gear carrier is commonly referred to as the feed motor, while the motor driving the second sun gear is commonly referred to as the traverse motor. The sun gear S1 may be referred to generally as a driven element whose direction and rate of rotation determines the direction and rate of movement of the table, while the carrier C may be referred to as a first driving element and the sun gear S2 as a second driving element. The direction of movement of the table T during a feed rate of movement depends upon the direction of rotation of the planet gear carrier C, and during a traverse rate of movement depends upon the direction of rotation of the second sun gear S2. As a result, when the table T is driven at a feed rate of movement after a traverse rate of movement in the same direction, there is a reaction in the planetary gear system tending to rotate the second sun gear S2 in a direction opposite to that in which it rotated during the rapid traverse movement. It is this reaction which is utilized in the present invention and by means of which a greatly simplified and improved brake construction is perfected.

Referring now more particularly to Figs. 1 to 3 of the drawings, 10 represents a journal in which is rotatable a shaft 11 adapted to be connected to some rotatable element that is to be braked as, for example, the second sun gear S2 of the planetary gear system shown in Fig. 4. Non-rotatably mounted on the shaft 11 as by a key 12 is a brake drum 13, and also non-rotatably mounted on the shaft 11 as by a key 14 is a pulley 15. The pulley is formed with a V-groove 16 in which is received a belt 17 associated with a driving motor such as the reversible traverse motor TM, previously mentioned, by which it is driven in a forward or reverse direction. The brake drum 13 and the pulley 15 are here shown mounted on the end of the shaft 11 with the hub of the brake drum 13 abutting a shoulder 18 on the shaft and retained against outward movement by the pulley 15, which in turn is secured by a nut 20 threaded on the end of the shaft.

As previously stated, the brake has both frictional means for arresting the rotation of the shaft 11 and the element with which it is associated as well as mechanically engaging means for positively holding the shaft 11 against rotation after it has been brought to rest. Accordingly, a pair of diametrically oppositely disposed brake shoes 23 and 24 are provided which are adapted to cooperate with the brake drum 13. These shoes are each pivoted on a pin 25 extending through a block 26 forming a part of the frame 27 of the brake. Herein, the brake shoes are normally applied and to that end suitable linkage generally designated 28 is connected between the remaining free ends of the brake shoes and cooperating therewith is a compression spring 29 functioning yieldably to apply the brake shoes to the drum 13. The brake shoes are disengaged from the drum 13 by positive actuation of the linkage 28 and the actuating force herein is supplied by a solenoid 31. Accordingly the core of the solenoid 31 is connected by means of a link 32 to the linkage 28 and serves when the solenoid is energized to pull the linkage 28 downwardly as viewed in Figs. 1 and 2, and thereby cause a release of the brake shoes as more particularly described in the co-pending application of Granberg et al. above identified.

For the sake of convenience and proper operation, the solenoid 31 and the traverse motor TM are so connected that both will be energized or deenergized simultaneously, thereby causing release of the brake shoes when the pulley 15 is driven by the traverse motor and causing application of the brake shoes whenever the traverse motor is deenergized. As shown in Fig. 4, the solenoid 31 and the traverse motor TM are connected in parallel and together with the feed motor FM are governed by an electrical control including a drum switch D. This drum switch, as more particularly disclosed in the Granberg et al. application above referred to, is rockable from a central or neutral position to an extreme position on either side of the central position. When the drum switch is rocked to one extreme position, the solenoid 31 and the traverse motor are energized to rotate the sun gear S2 in a forward (clockwise as viewed in Fig. 1) direction, but when rocked to the other extreme position the solenoid 31 and the traverse motor are again energized but the motor is driven in the opposite direction to rotate the sun gear S2 in the oposite or reverse direction. These extreme positions are known respectively as traverse forward and traverse return. When the drum switch is rocked to central position from traverse forward, the solenoid and the traverse motor are deenergized and the feed motor is energized to rotate the carrier C to obtain a movement of the table in the same direction but at a feed rate. In the present instance, the table is stopped when the drum switch is rocked to neutral from traverse position but, of course, a return feed movement could be obtained by a change in the electrical control.

The drum switch D may be rocked manually by means of a handle 33 or may be rocked automatically to obtain an automatic cycle of movement of the table T. Herein the drum switch is rocked by means of dogs carried by a disk 34 driven in timed relation with the movement of the table T.

The mechanically engaging means serving to hold the shaft 11 stationary after it has been brought to rest is in the nature of detent means and comprises an annular toothed or notched member or ring 35 which is carried in an annular recess 36 formed on the brake drum 13 and retained for rotation with the brake drum by means of pins 37. Cooperating with the ring 35 is a pawl or dog 38 pivotally mounted on a pin 39 mounted in an upstanding portion 40 of the frame 27 and secured by means of a set screw 41. One end of the dog 38 is formed with a nose or hook 42 for cooperation with the toothed ring 35, while the other end is elongated and carries an adjusting screw 43. The dog 38 is urged toward engagement with the ring 35 by means of a tension spring 44 anchored at one end to a pin 45 adjustably secured in the frame 27 and at the other end engaging a rod 46 extending longitudinally from the nose of the dog 38. The dog 38 is disengaged from the ring 35 upon energization of the solenoid 31 through the medium of a pin 48 extending laterally of the link 32 and projecting over the end of the dog 38 to engage the adjusting screw 43 and thereby pivot the dog about the pin 39 to disengage it from the ring 35. If desired the teeth formed in the ring 35 by the notches therein may be slightly undercut on one side and the nose 42 of the dog 38 may likewise be undercut so as to provide the maximum resistance to disengagement of the dog and the ring during maximum tendency of the brake drum 13 to rotate.

Control means must be provided for holding the dog 38 out of engagement with the ring 35 after the solenoid 31 has been deenergized and before the brake drum 13 has been brought to rest. Herein this means is of unique construction enabling the same to be very simple yet very positive and reliable in its operation. To that end there is rotatably mounted in the recess 36 on the brake drum 13 an annular member 50 which has a radial width somewhat greater than the ring 35, as best seen in Fig. 1, in order to extend radially outwardly of the ring 35. The dog 42 is made wide enough to extend across both the ring 35 and the member 50 and thus the latter prevents engagement of the dog 38 with the ring 35 when the dog rests upon the outer periphery of the member 50. To permit engagement of the dog 38 with the ring 35 at certain times, a notch 51 is cut in the member 50 at a place opposite the nose 42 of the dog 38 to a depth slightly exceeding the depth of the notches formed in the ring 35 and of a circumferential length in excess of the thickness of the nose 42 and in excess of the circumferential width of a notch in the ring 35. It will be apparent, therefore, that when the member 50 is positioned with its notch 51 opposite the nose 42 of the dog 38, as in Fig. 1, the dog may drop down into a notch on the ring 35 and hold the brake drum against rotation by mechanical engagement. When, however, the member 50 is rotated either clockwise or counterclockwise, from the position of Fig. 1 to a position shown, for example, in Fig. 3, the nose 42 rests on the periphery of the member 50 and thus holds the dog out of engagement with the ring 35.

In order to position the member 50 with the notch 51 opposite the nose 42 of the dog, or with an edge of the notch rotated just past the nearest edge of the nose 42 so that the dog will be held out of engagement with the ring 35, a friction disk 53 bears against the member 50. This friction disk is mounted to rotate with the brake drum 13 by means of a plurality of bolts 54 which project through apertures 55 in the disk 53 and are threaded into the brake drum 13. Encircling each bolt 54 is a compression spring 56 at one end abutting the disk 53 and at the other end abutting adjustable lock nuts 57 so as to urge the disk 53 yieldably into engagement with the member 50. In order to make the member 50 effective, it is confined to a limited oscillatory movement and to that end has formed in its periphery opposite the notch 51 a notch 58 somewhat longer than the notch 51 and adapted to cooperate with pins 59 fixed in the frame 27. The notch 58 is of such length and the pins 59 are so spaced and so positioned relative to the notch 51 and the nose 42 of the dog 38 that when either end of the notch 58 strikes one of the pins 59 an edge of the notch 51 will have rotated just beneath the nose 42 to a position such as that shown in Fig. 3, whereby the dog will be held out of engagement with the ring 35. Due to the frictional engagement of the member 50 with the brake drum 13, the member 50 is rotated with the brake drum regardless of the direction of rotation to the extent permitted by the notch 58 and the pins 59 and, therefore, slips relative to the brake drum.

As previously stated, the present invention utilizes the tendency of the brake drum 13 to have a certain counter-rotation after it is brought to rest. Such a tendency is very pronounced when the brake is associated with a planetary gear system, as herein disclosed, and is present to a greater or lesser degree in many other mechanisms. In the present instance the sun gear S2 is the element to be braked and is the element that provides the counter-rotation to which the dog control means is responsive. This will become more apparent from a consideration of the operation of the brake when employed in connection with a planetary gear system. Let it be assumed that the table T is to be driven first at a traverse rate in a forward direction, then at a feed rate in a forward direction, and then at a traverse rate in a return direction. Let it be assumed further that the motors and the solenoid are deenergized and that the brake is in the position shown in Figs. 1 and 2. The operation would then be as follows:

To drive the table T at a traverse rate in a forward direction, the traverse motor TM and the solenoid 31 would be energized by rocking the drum switch D with the result that the link 32 would be drawn downwardly and thus through the linkage 28 the brake shoes 23 and 24 would be released and through the pin 48 the dog 38 would be pivoted to withdraw the nose 42 from mechanical engagement with the ring 35. The brake drum 13 thus would be released for rotation by the traverse motor through the belt 17 and pulley 15 imparting rotation to the shaft 11 and the element connected therewith, herein sun gear S2 of the planetary gear system. This rotation of the pulley 15, in the present instance, is in a clockwise direction, as viewed in Fig. 1. The initial rotation of the brake drum 13 thus will carry with it the member 50 until further rotation of the member 50 is arrested by abutment of one end of the notch 58 with a pin 59. At such time the member 50 will be in the position shown in Fig. 3, that is with the notch 51 rotated clockwise just slightly past the edge of the nose 42 of the dog 38 so that it would strike and rest upon the outer periphery of the member 50 were the solenoid 31 deenergized. Because of the friction disk 53, the member 50 is permitted to slip after it has been arrested by engagement with the pin 59, and thus remains in the position shown in Fig. 3 during the remainder of the traverse movement. Normally this traverse rate of movement, particularly in a machine tool, is of short duration and so the slipping of the member 50 is not harmful.

At the end of the traverse rate of movement the drum switch D is rocked to neutral position to drive the table at a feed rate of movement. This may be done manually but herein is done automatically by means of the dogs on the disk 34. Such rocking of the switch D effects the deenergization of the solenoid 31 and the traverse motor TM while the feed motor FM is energized to drive the carrier C in a direction continuing the forward movement of the table T. As a result of the deenergization of the solenoid and traverse motor, the spring 29 is free to apply the brake shoes 23 and 24, bringing the brake drum 13, the shaft 11, and the sun gear S2, carried on the shaft, to rest. Deenergization of the solenoid 31 also releases the dog 38 to the spring 44 but the dog is not permitted to engage the ring 35 immediately because the member 50 is still in the position shown in Fig. 3 and thus is positioned to prevent such engagement of the dog. However, when the feed motor supplies the driving force the reaction in the planetary gear system tends to rotate sun gear S2 and brake drum 13 in a counterclockwise direction, that is, reversely to the direction in which they were rotating during the traverse movement. With the first tendency of the brake drum 13 to rotate in a counterclockwise direction, however, the member 50 is rotated in a counterclockwise direction and thus brings the notch 51 beneath the nose 42 of the dog, thereby permitting the same to drop into engagement with the ring 35 and thus positively retain the brake drum 13, the shaft 11 and the sun gear S2 stationary. It is to be understood, of course, that the friction brake means provides a considerable braking force and that with light feed loads may be sufficient in itself to prevent counterclockwise rotation of the brake drum, in which case the mechanical detent means is not necessary and is not applied. However, this means is always in reserve, positively to hold the brake drum against rotation should the feed load be so great that the reaction in the gear system tends to impart a counterclockwise rotation to the brake drum 13.

At the end of the feed movement the switch, through the dogs on the disk 34, is rocked to traverse return position so that the traverse motor and the solenoid 31 are again energized but the traverse motor is now energized to rotate in a reverse direction, that is, to drive the pulley 15 in a counterclockwise direction, as viewed in Fig. 1. As a result the dog 38 would be withdrawn and the brake shoes released so that the traverse motor could again drive the sun gear S2 but this time in a direction to effect a traverse return movement of the table T. Herein such movement of the sun gear S2 is counterclockwise, as viewed in Fig. 1. With the first rotation of the brake drum 13 in a counterclockwise direction, the member 50 would be carried with the brake drum 13 to the limit of movement permitted by one of the pins 59 in which position the notch 51 would have been rotated just slightly past the nose 42 of the dog in a counterclockwise direction, and thus would again be in a position to prevent the dog from engaging the ring 35 upon deenergization of the solenoid 31. Thus again the dog 38 would be held out of engagement so long as there is any rotation of the brake drum 13 in a counterclockwise direction, but upon the very first movement of the brake drum in a clockwise direction the member 50 would again be withdrawn from beneath the nose 42, permitting the dog to drop into engagement with the ring 35.

It is believed apparent from the foregoing that we have perfected a greatly improved brake mechanism of the type having both frictional and mechanically engaging means. The control for the mechanically engaging means is of a unique yet simple construction and also operates upon a unique principle rendering the control unusually positive in its operation. While having many other uses, the brake is particularly adapted for use with a planetary gear system.

We claim as our invention:

1. A brake mechanism for use with a planetary gear system having a rotatable element to be driven to obtain a predetermined operation of the planetary gear system and to be held against rotation to obtain a different operation of the planetary gear system comprising a brake drum adapted to be associated with the element of the planetary gear system, braking means cooperable with the brake drum to bring the same to rest, mechanical detent means for holding said brake drum against rotation associated with said braking means to be withdrawn upon release of the braking means, and means holding said detent means inoperative while said brake drum is still rotating controlled directly by said brake drum.

2. A brake mechanism for use with a differential gear system having a rotatable element to be driven to obtain a predetermined operation of the differential gear system and to be held against rotation to obtain a different operation of the gear system comprising a brake drum adapted to be associated with the element of the differential gear system, braking means cooperable with the brake drum to bring the same to rest, mechanical detent means for holding said brake drum against rotation associated with said braking means to be withdrawn upon release of the braking means, and means holding said detent means inoperative while said brake drum is still rotating actuated by counter-rotation of the brake drum to permit engagement of said mechanical detent means.

3. A brake mechanism for use with a planetary gear system having a rotatable element to be driven to obtain a predetermined operation of the planetary gear system and to be held against rotation to obtain a different operation of the planetary gear system comprising a brake drum adapted to be associated with the element of the planetary gear system, braking means cooperable with the brake drum to bring the same to rest, mechanical detent means for holding said brake drum against rotation associated with said braking means to be withdrawn upon release of the braking means, and means holding said detent means inoperative until said brake drum is brought to rest, said means being frictionally driven by said brake drum to be responsive to the direction of rotation thereof and during the driving of the element of the planetary gear system being moved to a position preventing engagement of said detent means and moved by the reaction in the planetary gear system while the element is held against rotation to a position permitting engagement of said detent means.

4. A brake mechanism for use in a differential gear system having a rotatable element to be driven to obtain a predetermined operation of the gear system and to be held against rotation to obtain a different operation of the gear system comprising a frame, a brake drum adapted to be associated with the element of the differential gear system, braking means cooperable with the brake drum to bring the same to rest, mechanical detent means for holding said brake drum against rotation comprising a dog pivotally mounted on said frame and notched means fixed for rotation with said brake drum with which said dog is engageable, said dog being associated with said braking means to be withdrawn from engagement with said notched means upon release of the braking means, and means holding said detent means inoperative until said brake drum is brought to rest comprising an annular member having a limited movement with respect to said dog and frictionally driven from said brake drum to be responsive to the direction of rotation of said brake drum, said annular member in its extreme positions of movement preventing engagement of said detent means and intermediate its extreme limits of movement permitting engagement of said detent means.

5. A brake mechanism for use with a planetary gear system having a rotatable element to be driven to obtain a predetermined operation of the planetary gear system and to be held against rotation to obtain a different operation of the planetary gear system comprising a frame, a brake drum adapted to be associated with the element of the planetary gear system, frictional braking means cooperable with the brake drum to bring the same to rest, said braking means being spring-applied, mechanical detent means for aiding said braking means in holding said brake drum against rotation comprising a toothed-ring fixed to rotate with said brake drum and a dog pivotally mounted on said frame and urged into engagement with said toothed-ring, said dog being wider than said toothed-ring and associated with said braking means to be withdrawn upon release of the braking means, and means holding said detent means inoperative until said brake drum is brought to rest comprising an annular member rotatably mounted on said brake drum adjacent said toothed-ring, said member having a radial width greater than said toothed-ring so as to extend radially outwardly of the toothed-ring to prevent engagement of said dog with said toothed-ring when the dog strikes the outer periphery of said annular member, means rotatable with the brake drum frictionally engaging said member to render the same responsive to the direction of rotation of said brake drum, a notch formed in the periphery of said annular member operable when disposed opposite said dog to permit engagement of said dog with said toothed-ring to hold said brake drum against rotation, and means limiting the rotation of said annular member by said brake drum to extreme positions in which an edge of the notch in said annular member is positioned just beneath said dog so that slight counter rotation of the brake drum presents the notch to the dog to permit engagement of the detent means.

6. The combination of a planetary gear system having a rotatable element to be driven to obtain a predetermined operation of the system and to be held against rotation to obtain a different operation of the system and a brake mechanism for said element comprising frictional braking means for bringing said element to rest, mechanical detent means for holding said element against rotation, and means holding said detent means inoperative until said element is brought to rest responsive to the direction of rotation of said element and carried to a position preventing engagement of said detent means by the rotation of said element while driven and carried by the counter-rotation of said element incident to the reaction in said planetary system when said element no longer is driven to a position permitting engagement of said detent means.

7. The combination of a differential gear system having a driven element, a first driving element and a second driving element, said second driving element being driven to obtain a traverse movement of said driven element and being held stationary while said first driving element is driven to obtain a feed movement of said driven element, and a brake mechanism for said second driving element comprising a brake drum associated with said second driving element, normally applied frictional braking means cooperating with said brake drum to bring said second element to rest, mechanical detent means for holding said second element against rotation including a pivotally mounted dog biased toward engaged position, means for releasing said frictional braking means and pivoting said dog out of engaged position, and means controlling the engagement of said detent means comprising a member having a limited oscillatory movement with respect to said dog and frictionally driven from said brake drum to move with the brake drum during the initial movement thereof in either direction, said member when at the limit of its movement in either direction holding said dog out of engagement and when intermediate its extreme limits permitting engagement of said dog.

8. In a machine tool, a reciprocable table, a first motor, a second motor, differential gearing having a driven element connected to said table to drive the same at feed and traverse rates and in forward and return directions depending upon the speed and direction of rotation of the driven element, a first driving element connected to be rotated by said first motor for imparting a feed movement to said table, and a second driving element connected to be rotated by said second motor in forward and reverse directions to impart a traverse movement to said table, a brake for bringing said second driving element to rest, mechanical detent means for holding said second driving element stationary so that a feed rate of movement may be imparted to said table by said first driving element, said detent means being associated with said brake to be withdrawn upon release of the brake, and control means for holding said detent means inoperative until said second driving element is brought to rest, said control means being frictionally driven from said second driving element and responsive to counter-rotation of said second driving element to permit engagement of said detent means.

9. In a machine tool, a reciprocable table, a first motor, a second motor, differential gearing having a driven element connected to said table to drive the same at feed and traverse rates and in forward and return directions depending upon the speed and direction of rotation of the driven element, a first driving element connected to be rotated by said first motor for imparting a feed movement to said table, and a second driving element connected to be rotated by said second motor in forward and reverse directions to impart a traverse movement to said table, a brake for bringing said second driving element to rest, mechanical detent means for holding said second driving element stationary so that a feed rate of movement may be imparted to said table by said first driving element, said detent means being associated with said brake to be withdrawn upon release of the brake, and control means for holding said detent means inoperative while said second driving element is still rotating including a member frictionally driven from said brake drum and shifted when said second driving element is driven to a position preventing engagement of said detent means, and shifted when said second driving element has a reactionary rotation as an incident to the operation of said differential gearing at a feed rate to permit engagement of said detent means.

10. A brake mechanism comprising, in combination, a brake drum, frictional braking means for arresting the rotation of said brake drum, mechanical detent means for holding said brake drum against rotation, said mechanical detent means being associated with said frictional braking means to be rendered inoperative upon release of said braking means, and means for holding said mechanical detent means inoperative while said brake drum is rotating frictionally driven from said brake drum.

11. A brake comprising, in combination, a brake drum, means for frictionally engaging the drum to arrest rotation thereof, means adapted mechanically to engage means fast on the brake drum to hold the same stationary, means for disengaging said frictionally and said mechanically engaging means from said brake drum to permit rotation thereof, and means for holding said mechanically engaging means disengaged during rotation of said brake drum, said last named means being operable upon arrest and reverse movement of said brake drum to permit engagement of said mechanical means.

12. A brake mechanism comprising, in combination, a brake drum, frictional braking means for arresting the rotation of said brake drum, mechanical detent means for holding said brake drum against rotation, said mechanical detent means being associated with said frictional braking means to be rendered inoperative upon release of said braking means, and means for holding said mechanical detent means inoperative while said brake drum is rotating, said means being driven by said brake drum and responsive to a reversal in the direction of rotation thereof to permit engagement of said mechanical detent means.

13. A brake mechanism comprising in combination, a brake drum, frictional braking means cooperable with the brake drum to bring the same to rest, mechanical detent means for holding said brake drum against rotation after it has been brought to rest associated with said frictional braking means to be disengaged upon release of said braking means, and means holding said detent means inoperative until said brake drum is brought to rest comprising an annular member frictionally driven by said brake drum and having a limited oscillatory movement, said member being carried to a position rendering the detent means inoperative as an incident to rotation of said brake drum and carried to a position permitting engagement of said detent means as an incident to the initial rotation of the brake drum in a counter direction.

14. A brake mechanism comprising, in combination, a rotatable brake drum, frictional spring-applied braking means for arresting rotation of said brake drum, means including a solenoid and linkage actuated by said solenoid for releasing said frictional braking means, a toothed ring fixed on said brake drum for rotation therewith, a detent operable to engage said toothed ring to hold said brake drum positively against rotation, means associated with said linkage for retracting said detent as an incident to the release of said frictional braking means by energization of said solenoid, and a member frictionally driven from said brake drum but having a limited oscillatory movement with respect to said detent and having a notch in its periphery adapted to receive the end of the detent permitting engagement of the detent with the toothed-ring, said ring in its extreme positions rendering said detent inoperative and in positions other than said extreme positions rendering said detent means operative to engage the toothed-ring.

15. A brake mechanism comprising, in combination, a frame, a rotatable brake drum, frictional spring-applied braking means for arresting the rotation of said drum, a solenoid operatively associated with said braking means to release the same upon energization of the solenoid, a toothed-ring fixed on said brake drum to rotate therewith, a detent pivotally mounted on said frame and urged into engagement with said toothed-ring positively to hold said brake drum against rotation, means associated with the frictional braking means to disengage said detent upon release of said braking means as an incident to energization of said solenoid, an annular member rotatably mounted on said brake drum having a limited oscillatory movement with respect to said detent and said frame and having means formed in it for preventing engagement of said detent with said toothed-ring when said annular member is in either extreme position and to permit engagement of said detent when said annular member is intermediate its extreme positions, a friction disk carried by said brake drum frictionally engaging said annular member to carry the same with it to the extent of the permissible oscillatory movement of the member, and springs urging said friction disk toward engagement with said annular ring.

16. The combination of a member to be driven, a first electric motor, a second electric motor, differential gearing having a driven element connected to said member to drive the same at feed and traverse rates depending upon the speed of rotation of the driven element, a first driving element connected to be rotated by said first motor for imparting a feed movement to said member and a second driving element connected to be rotated by said second motor to impart a traverse movement to said member, a brake for bringing said second driving element to rest, mechanical detent means for holding said second driving element stationary so that a feed rate of movement may be imparted to said table by said first driving element, said detent means being associated with said brake to be withdrawn upon release of the brake, a solenoid for releasing said brake and withdrawing said detent means, electrical control means governing the operation of said motors and said solenoid operable under one condition to energize said second motor and said solenoid to release said brake and withdraw said detent means and energize said second motor to drive said second driving element to obtain a traverse movement of said member, said electrical control under a different condition being operable to deenergize said solenoid and said second motor to bring said second driving element to rest and to energize said first motor to obtain a free rate of movement of said member, and control means for holding said detent means withdrawn after the solenoid has been deenergized but while said second driving element is still rotating and responsive to a tendency of said second driving element to rotate in a counter direction to permit engagement of said detent means.

17. The combination of a member to be driven, a first electric motor, a second electric motor, differential gearing having a driven element connected to said member to drive the same at feed and traverse rates depending upon the speed of rotation of the driven element, a first driving element connected to be rotated by said first motor for imparting a feed movement to said member and a second driving element connected to be rotated by said second motor to impart a traverse movement to said member, a brake for bringing said second driving element to rest, mechanical detent means for holding said second driving element stationary so that a feed rate of movement may be imparted to said table by said first driving element, said detent means being associated with said brake to be withdrawn upon release of the brake, a solenoid for releasing said brake and withdrawing said detent means, electrical control means including a drum switch rockable to various positions for controlling the energization of said motors and said solenoid, said drum switch in one position energizing said second motor and said solenoid to effect a drive of said member through the differential gearing at a traverse rate of movement, and said drum switch in a different position effecting deenergization of said second motor and said solenoid and effecting energization of said first motor for driving said member through the differential gearing at a feed rate of movement in the same direction, and control means for holding said detent means inoperative after said solenoid has been deenergized and while said second driving element is still rotating, said control means being frictionally driven from said second driving element and responsive to a tendency toward counter-rotation of said second driving element to permit engagement of said detent means.

BENGT R. GRANBERG.
ALFRED G. ERICSON.